(12) United States Patent
Aoki et al.

(10) Patent No.: US 11,618,530 B1
(45) Date of Patent: Apr. 4, 2023

(54) CLEAT ADAPTER SYSTEM

(71) Applicant: Shimano Inc., Osaka (JP)

(72) Inventors: Toshiaki Aoki, Osaka (JP); Kaoru Ouchi, Osaka (JP); Kadunori Iuchi, Osaka (JP); Shota Nishijima, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/502,730

(22) Filed: Oct. 15, 2021

(51) Int. Cl.
| | | |
|---|---|---|
| *B62M 3/08* | (2006.01) | |
| *A43B 5/14* | (2006.01) | |
| *B62J 45/421* | (2020.01) | |
| *B62J 45/416* | (2020.01) | |
| *B62J 45/413* | (2020.01) | |
| *B62J 45/20* | (2020.01) | |
| *B62J 45/412* | (2020.01) | |

(52) U.S. Cl.
CPC .............. *B62M 3/086* (2013.01); *A43B 5/14* (2013.01); *B62J 45/416* (2020.02); *B62J 45/421* (2020.02); *B62J 45/20* (2020.02); *B62J 45/412* (2020.02); *B62J 45/413* (2020.02)

(58) Field of Classification Search
CPC ......... B62M 3/086; A43B 5/14; B62J 45/421; B62J 45/416; B62J 45/412; B62J 45/20; B62J 45/413
See application file for complete search history.

(56) References Cited

U.S. PATENT DOCUMENTS

| | | | |
|---|---|---|---|
| 9,375,053 B2 | 6/2016 | Burns et al. | |
| 10,342,285 B2 | 7/2019 | Aoki et al. | |
| 10,575,591 B2 | 3/2020 | Schum et al. | |
| 10,595,586 B2 | 3/2020 | Winefordner et al. | |
| 2009/0308179 A1* | 12/2009 | Wyatt | A61B 5/0002 73/818 |
| 2013/0104429 A1 | 5/2013 | Torres | |
| 2015/0025816 A1* | 1/2015 | Ross | A61B 5/11 702/44 |
| 2015/0177083 A1* | 6/2015 | Redmond | G01L 3/245 73/379.01 |
| 2015/0253210 A1* | 9/2015 | Ashby | A43B 5/14 702/41 |
| 2016/0198803 A1 | 7/2016 | Soderberg et al. | |
| 2016/0273983 A1* | 9/2016 | Grengs | A43B 3/44 |
| 2019/0000190 A1* | 1/2019 | Degodoi | A43B 5/14 |

* cited by examiner

*Primary Examiner* — Daniel D Yabut

(74) *Attorney, Agent, or Firm* — Global IP Counselors, LLP

(57) ABSTRACT

A cleat adapter system is provided for a cycling shoe. The cleat adapter system comprises a first connecting portion, a second connecting portion, an actuator, a communicator and a controller. The first connecting portion is configured to be connected to a cleat. The second connecting portion is connected to the first connecting portion. The actuator operatively is coupled to one of the first connecting portion and the second connecting portion. The second connecting portion is configured to adjust a relative position between the first connecting portion and the second connection portion. The communicator is configured to receive at least one of bicycle information and user information. The controller operatively couples the actuator and the communicator. The controller is configured to control the actuator to adjust the relative position based on at least one of the bicycle information and the user information.

21 Claims, 10 Drawing Sheets

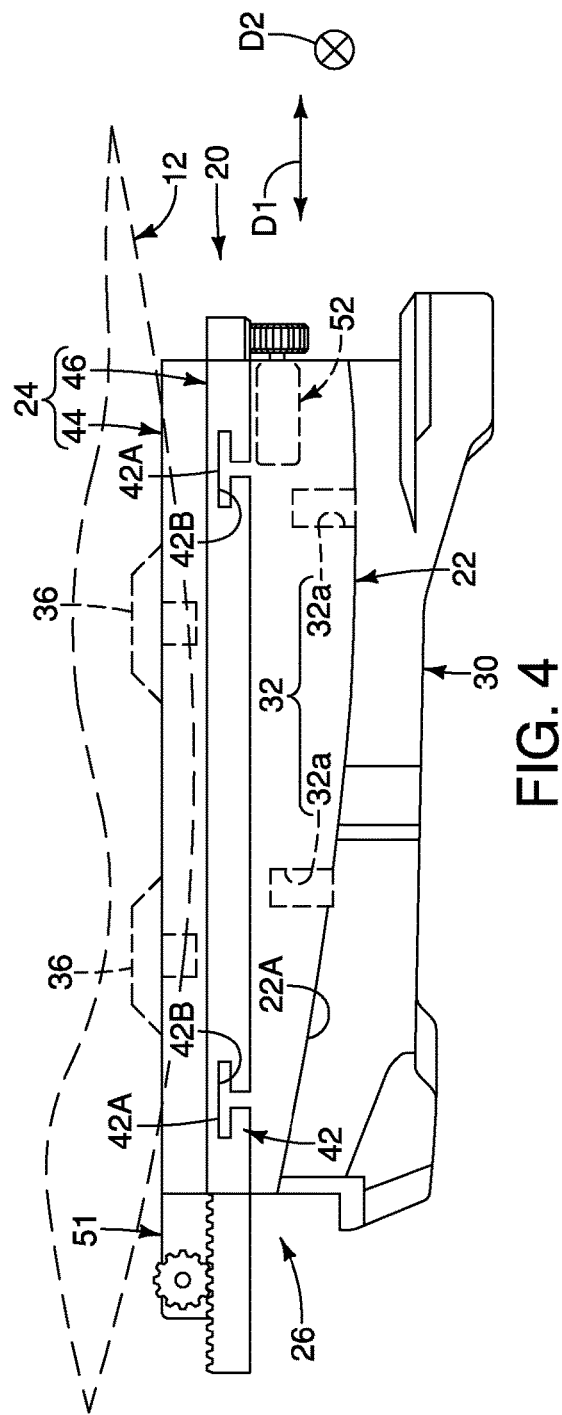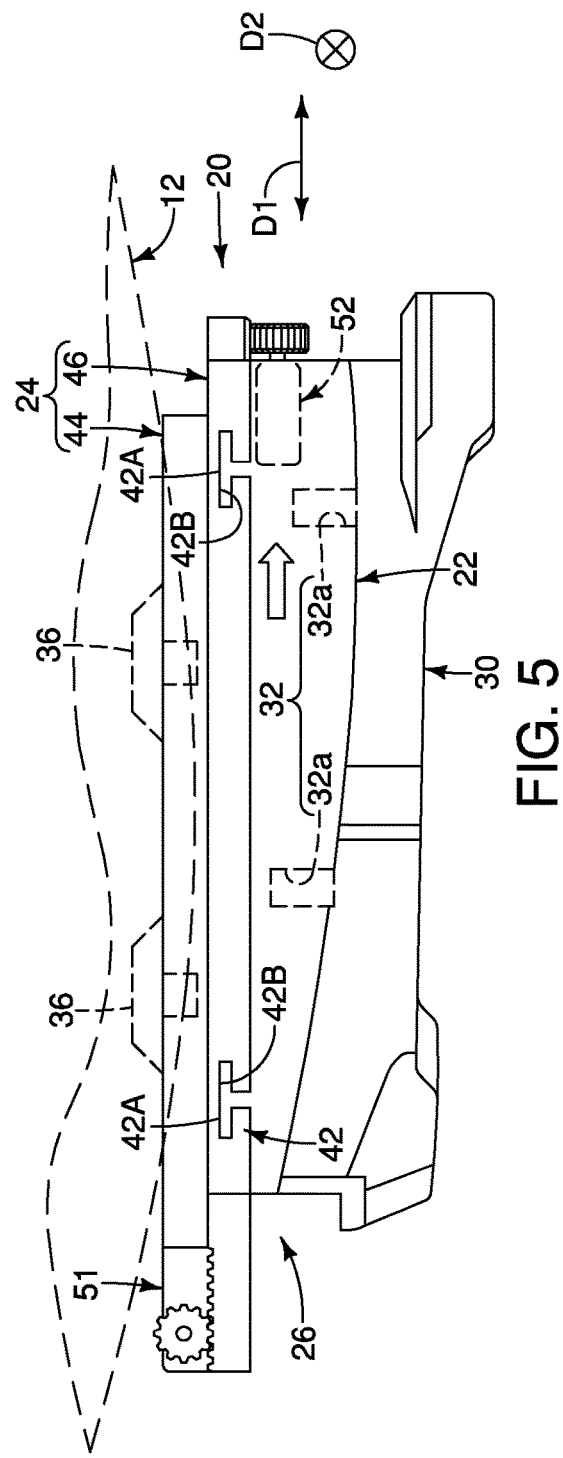

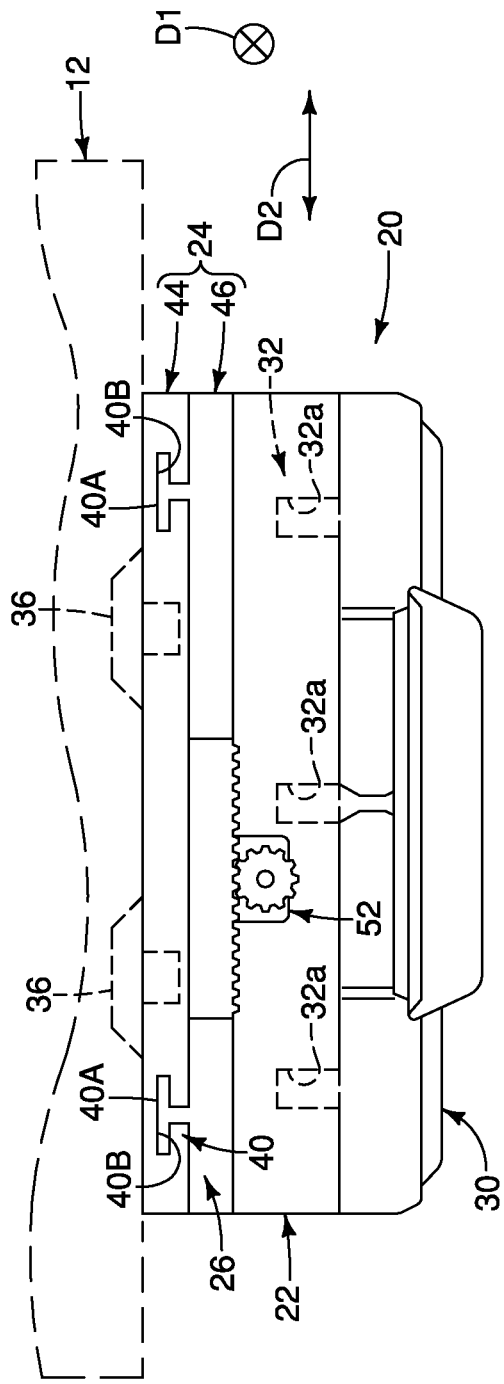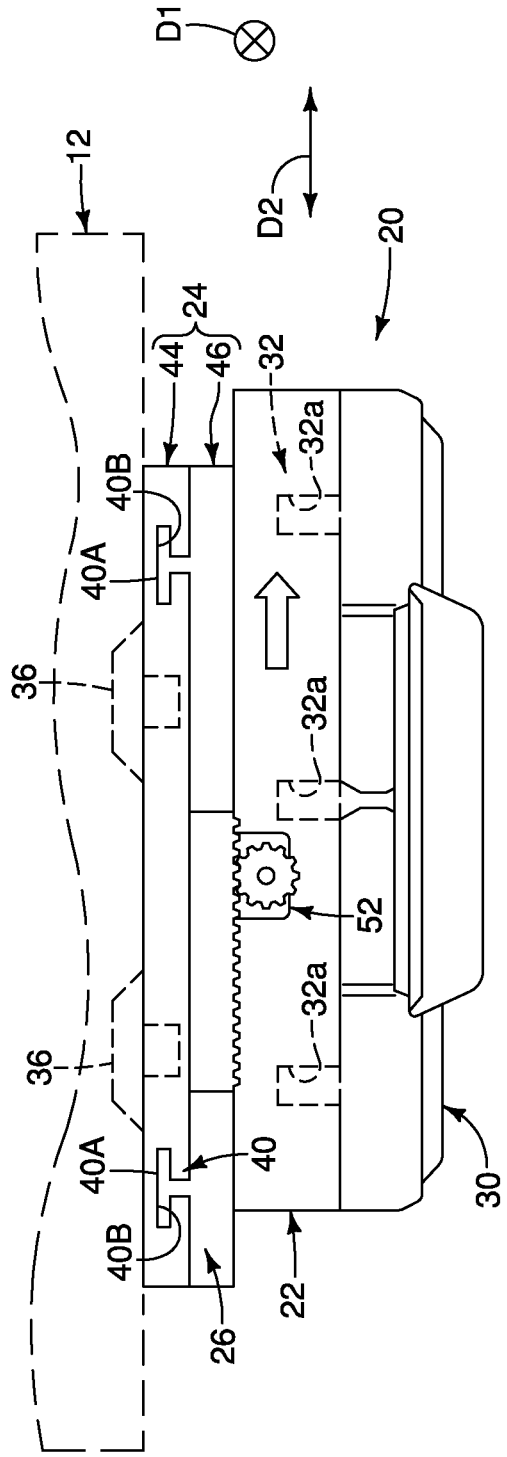

CLEAT ADAPTER SYSTEM

BACKGROUND

Technical Field

This disclosure generally relates to a cleat adapter system. More specifically, the present disclosure relates to a cleat adapter system for adjustably attaching a cleat to a cycling shoe.

Background Information

Various types of cycling shoes are available to suit a rider's riding style (e.g., road riding or off-road riding. Many bicycles use step-in or clipless pedals, which are used with cycling shoes having a cleat attached to the bottom of the sole. The step-in or clipless pedal engages the cleat to releasably secured to the pedal to the sole of the cycling shoe. In particular, with this type of bicycle pedal, the rider steps onto the pedal, and a clamping mechanism automatically grips the cleat to secure the pedal to the cleat. When releasing the shoe from the pedal, the rider will typically turn the shoe about an axis perpendicular to the tread of the pedal. As a result of the pivoting action, the clamping mechanism releases the cleat from the sole. Typically, the position of the cleat on the sole can be adjusted by loosening two or more bolts that fasten the cleat to the sole. For example, a cycling shoe that has a cleat fastened to the sole is disclosed in U.S. Pat. No. 10,342,285, which is assigned to Shimano Inc.

SUMMARY

Generally, the present disclosure is directed to various features of a cleat adapter system for a cycling shoe. Basically, the cleat adapter system connects a cleat to a sole of a cycling shoe. One object presented in the present disclosure is to provide a cleat adapter system that allows the position of the cleat to be adjusted on the sole.

In view of the state of the known technology and in accordance with a first aspect of the present disclosure, a cleat adapter system is provided for a cycling shoe. The cleat adapter system basically comprises a first connecting portion, a second connecting portion, an actuator, a communicator and a controller. The first connecting portion is configured to be connected to a cleat. The second connecting portion is connected to the first connecting portion. The actuator operatively is coupled to one of the first connecting portion and the second connecting portion. The second connecting portion is configured to adjust a relative position between the first connecting portion and the second connection portion. The communicator is configured to receive at least one of bicycle information and user information. The controller operatively couples the actuator and the communicator. The controller is configured to control the actuator to adjust the relative position based on at least one of the bicycle information and the user information.

With the cleat adapter system according to the first aspect, it is possible to appropriately position the cleat relative to the sole of the cycling shoe based on at least one of the bicycle information and the user information.

In accordance with a second aspect of the present disclosure, the cleat adapter system according to the first aspect is configured so that the second connecting portion is provided to a sole of the cycling shoe.

With the cleat adapter system according to the second aspect, the cleat adapter system can be attached to the sole of the cycling shoe.

In accordance with a third aspect of the present disclosure, the cleat adapter system according to the first aspect or the second aspect is configured so that the second connecting portion is integrated with the sole.

With the cleat adapter system according to the third aspect, the cleat adapter system can be more compactly arranged.

In accordance with a fourth aspect of the present disclosure, the cleat adapter system according to any one of the first aspect to the third aspect is configured so that the controller is configured to determine a target position based on at least one of the bicycle information and the user information, and the controller is configured to control the actuator to adjust the position of the one of the first connecting portion and the second connecting portion to the target position.

With the cleat adapter system according to the fourth aspect, the target position can be adjusted based on at least one of the bicycle information and the user information by adjusting position of the one of the first connecting portion and the second connecting portion.

In accordance with a fifth aspect of the present disclosure, the cleat adapter system according to any one of the first aspect to the fourth aspect is configured so that the controller is configured to determine an initial position, and the controller is configured to control the actuator to adjust the position of the one of the first connecting portion and the second connecting portion to the initial position.

With the cleat adapter system according to the fifth aspect, it is possible to adjust the position of the one of the first connecting portion and the second connecting portion to the initial position.

In accordance with a sixth aspect of the present disclosure, the cleat adapter system according to any one of the first aspect to the fifth aspect is configured so that the communicator is a wireless communicator.

With the cleat adapter system according to the sixth aspect, the controller can be conveniently located without using an electrical cable.

In accordance with a seventh aspect of the present disclosure, the cleat adapter system according to any one of the first aspect to the sixth aspect is configured so that the communicator includes an input to receive the bicycle information from an external device.

With the cleat adapter system according to the seventh aspect, it is possible to control the cleat position using an external device.

In accordance with an eighth aspect of the present disclosure, the cleat adapter system according to any one of the first aspect to the seventh aspect is configured so that the communicator is configured to receive the bicycle information from the external device via wireless communication.

With the cleat adapter system according to the eighth aspect, the communicator can receive the bicycle information from the external device without using electrical cables.

In accordance with a ninth aspect of the present disclosure, the cleat adapter system according to any one of the first aspect to the eighth aspect is configured so that the bicycle information includes a bicycle condition.

With the cleat adapter system according to the ninth aspect, the position of the cleat can be adjusted based on a bicycle condition.

In accordance with a tenth aspect of the present disclosure, the cleat adapter system according to any one of the first aspect to the ninth aspect is configured so that the bicycle condition includes at least one of a forward speed, a pedaling cadence, a pedaling input power, a driving force of a drive unit and global positioning coordinates of a bicycle.

With the cleat adapter system according to the tenth aspect, the position of the cleat can be adjusted based on at least one of a forward speed, a pedaling cadence, a pedaling input power, and global positioning coordinates.

In accordance with an eleventh aspect of the present disclosure, the cleat adapter system according to any one of the first aspect to the tenth aspect is configured so that the user information includes a shoe condition.

With the cleat adapter system according to the eleventh aspect, the position of the cleat can be adjusted based on a shoe condition.

In accordance with a twelfth aspect of the present disclosure, the cleat adapter system according to any one of the first aspect to the eleventh aspect is configured so that the shoe condition includes a temperature of an inner sole, humidity of the inner sole and an inner sole pressure received from a user.

With the cleat adapter system according to the twelfth aspect, the position of the cleat can be adjusted based on at least one of a temperature of an inner sole, humidity of the inner sole and an inner sole pressure received from a user.

In accordance with a thirteenth aspect of the present disclosure, the cleat adapter system according to any one of the first aspect to the twelfth aspect is configured so that the user information includes a user condition.

With the cleat adapter system according to the thirteenth aspect, the position of the cleat can be adjusted based on user condition.

In accordance with a fourteenth aspect of the present disclosure, the cleat adapter system according to any one of the first aspect to the thirteenth aspect is configured so that the user condition includes at least one of heart rate, body temperature, blood oxygen concentration and blood lactate level.

With the cleat adapter system according to the fourteenth aspect, the position of the cleat can be adjusted based on at least one of heart rate, body temperature, blood oxygen concentration and blood lactate level.

In accordance with a fifteenth aspect of the present disclosure, the cleat adapter system according to any one of the first aspect to the fourteenth aspect further comprises a first sensor configured to sense a relative position of the first connecting portion and the second connecting portion.

With the cleat adapter system according to the fifteenth aspect, it is possible to easily determine the position of the cleat relative to the sole of the cycling shoe.

In accordance with a sixteenth aspect of the present disclosure, the cleat adapter system according to any one of the first aspect to the fifteenth aspect is configured so that the controller is configured to determine a target position based on the bicycle information. The controller is further configured to determine a relative movement amount of the first connecting portion and the connecting second portion based on the relative position detected by the first sensor. The controller is further configured to automatically control the actuator to adjust one of the first connecting portion and the second connecting portion to the target position.

With the cleat adapter system according to the sixteenth aspect, it is possible to automatically control the actuator to adjust one of the first connecting portion and the second connecting portion to the target position using the first sensor.

In accordance with a seventeenth aspect of the present disclosure, the cleat adapter system according to any one of the first aspect to the sixteenth aspect is configured so that the controller is configured to determine the target position based on the user information corresponding to the bicycle information.

With the cleat adapter system according to the seventeenth aspect, the target position of the cleat can be appropriately set based on the user information corresponding to the bicycle information.

In accordance with an eighteenth aspect of the present disclosure, the cleat adapter system according to any one of the first aspect to the seventeenth aspect further comprises a storage device having stored one or more target position settings corresponding to the user information.

With the cleat adapter system according to the eighteenth aspect, it is possible to store one or more target position settings corresponding to the user information.

In accordance with a nineteenth aspect of the present disclosure, the cleat adapter system according to any one of the first aspect to the eighteenth aspect is configured so that the communicator is further configured to receive the user information from an external device.

With the cleat adapter system according to the nineteenth aspect, it is possible to control the cleat position using an external device.

In accordance with a twentieth aspect of the present disclosure, the cleat adapter system according to any one of the first aspect to the nineteenth aspect further comprises a second sensor configured to detect an engagement between the cleat and a pedal, and the controller is configured to start the control of the actuator to adjust relative position the first connecting portion and the second connecting portion upon determining engagement between the cleat and the pedal.

With the cleat adapter system according to the twentieth aspect, the cleat can be adjust at the appropriate time.

In accordance with a twenty-first aspect of the present disclosure, the cleat adapter system according to any one of the first aspect to the twentieth aspect is configured so that the controller is configured to control of the actuator to adjust the position to the initial position upon determining disengagement of the cleat from the pedal.

With the cleat adapter system according to the twenty-first aspect, it is possible to reset the cleat to the initial position upon determining engagement between the cleat and the pedal.

In accordance with a twenty-second aspect of the present disclosure, the cleat adapter system according to any one of the first aspect to the twenty-first aspect further comprises a rechargeable electric power source configured to receive electric power from a pedal where the cleat is engaged with a pedal.

With the cleat adapter system according to the twenty-second aspect, the costs for new batteries can be minimized by using a rechargeable battery.

In accordance with a twenty-third aspect of the present disclosure, a cleat adapter system is provided for a cycling shoe. The cleat adapter system basically comprises a first connecting portion, a second connecting portion, an actuator, a communicator and a controller. The first connecting portion is configured to be connected to a cleat. The second connecting portion is connected to the first connecting portion. The actuator operatively is coupled to one of the first connecting portion and the second connecting portion. The second connecting portion is configured to adjust a relative position between the first connecting portion and the second connection portion. The communicator is configured to receive data from an external device. The controller operatively couples the actuator and the communicator. The controller is configured to control the actuator to adjust the relative position between the first connecting portion and the second connection portion based on the data.

With the cleat adapter system according to the twenty-third aspect, it is possible to appropriately position the cleat relative to the sole of the cycling shoe based on the data that is received from an external device.

Also, other objects, features, aspects and advantages of the disclosed cleat adapter system will become apparent to those skilled in the art from the following detailed description, which, taken in conjunction with the annexed drawings, discloses preferred embodiments of the cleat adapter system.

BRIEF DESCRIPTION OF THE DRAWINGS

Referring now to the attached drawings which form a part of this original disclosure:

FIG. 4 is an enlarged side elevational view of a portion of the cycling shoe illustrated in FIGS. 2 and 3 in which the cleat in a first longitudinal position relative to the sole of the cycling shoe.

FIG. 5 is an enlarged side elevational view of the portion of the cycling shoe illustrated in FIG. 4 in which the cleat in a second longitudinal position relative to the sole of the cycling shoe.

FIG. 6 is an enlarged front elevational view of a portion of the cycling shoe illustrated in FIGS. 2 and 3 in which the cleat in a first lateral position relative to the sole of the cycling shoe.

FIG. 7 is an enlarged front elevational view of the portion of the cycling shoe illustrated in FIG. 6 in which the cleat in a second lateral position relative to the sole of the cycling shoe.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
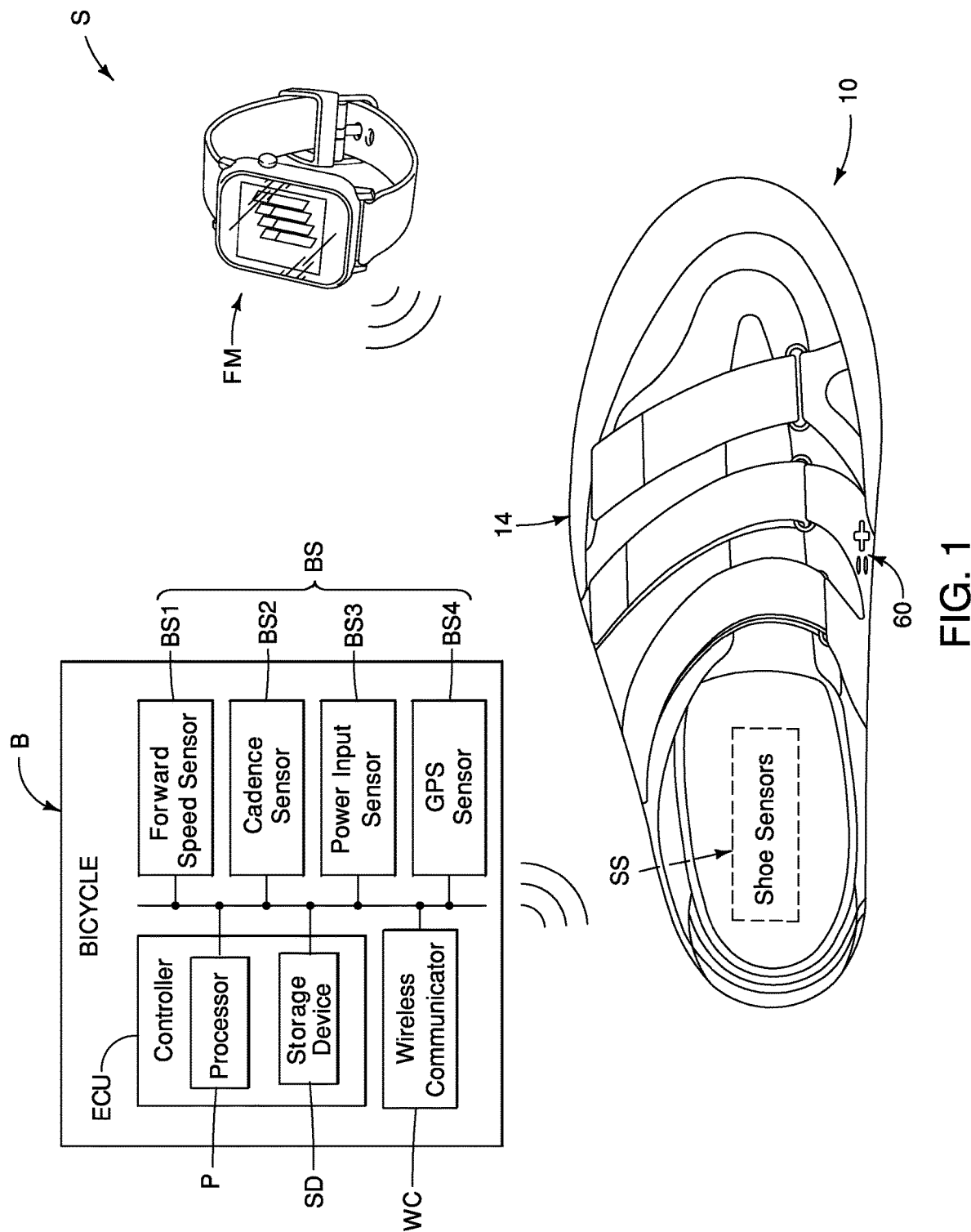
FIG. 1 is an overall diagrammatic view of a cycling shoe system having a cycling shoe that equipped with a cleat adapter system in accordance with one embodiment.
Figure 2:
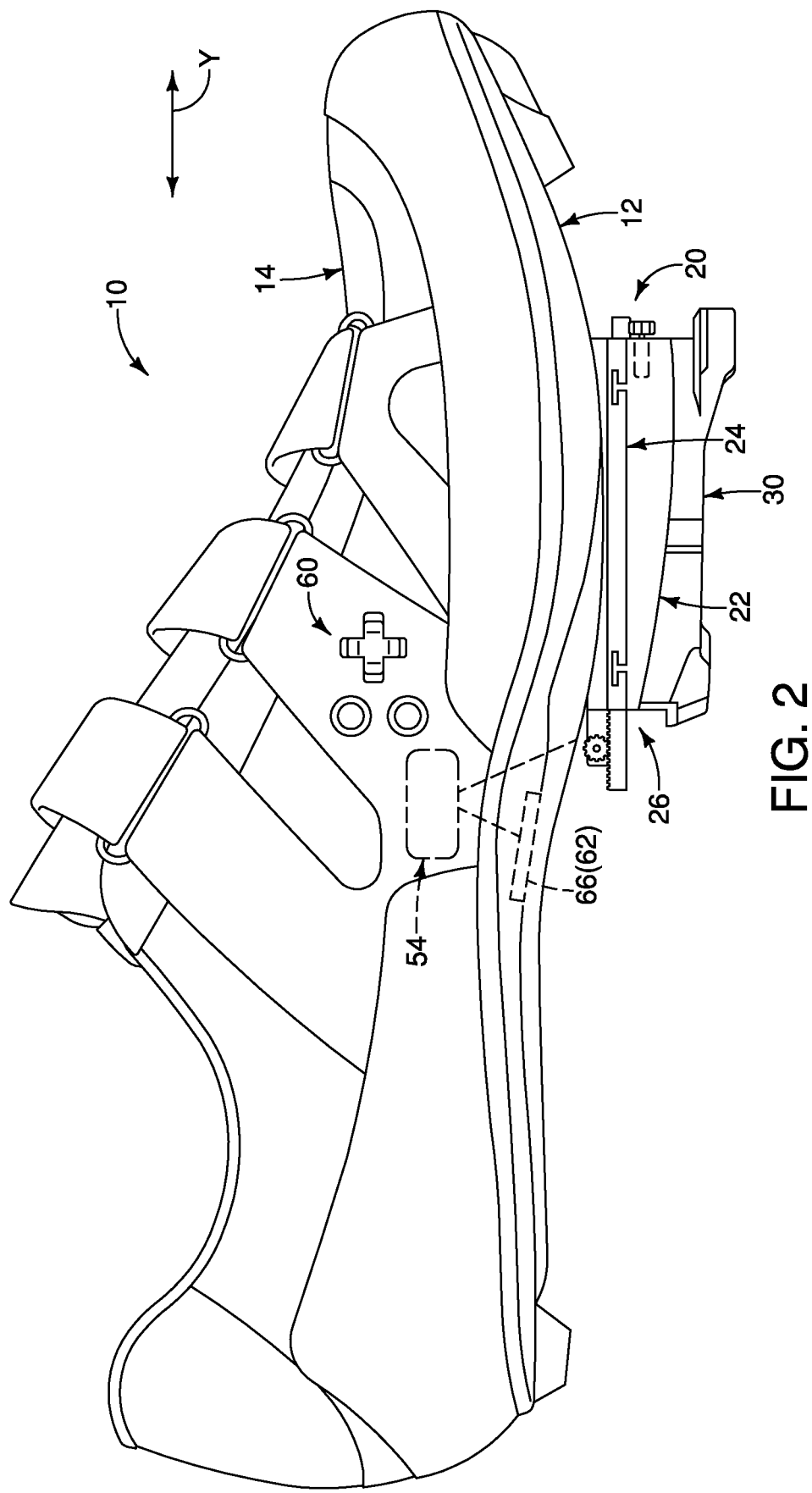
FIG. 2 is a side elevational view of the cycling shoe illustrated in FIG. 1.
Figure 3:
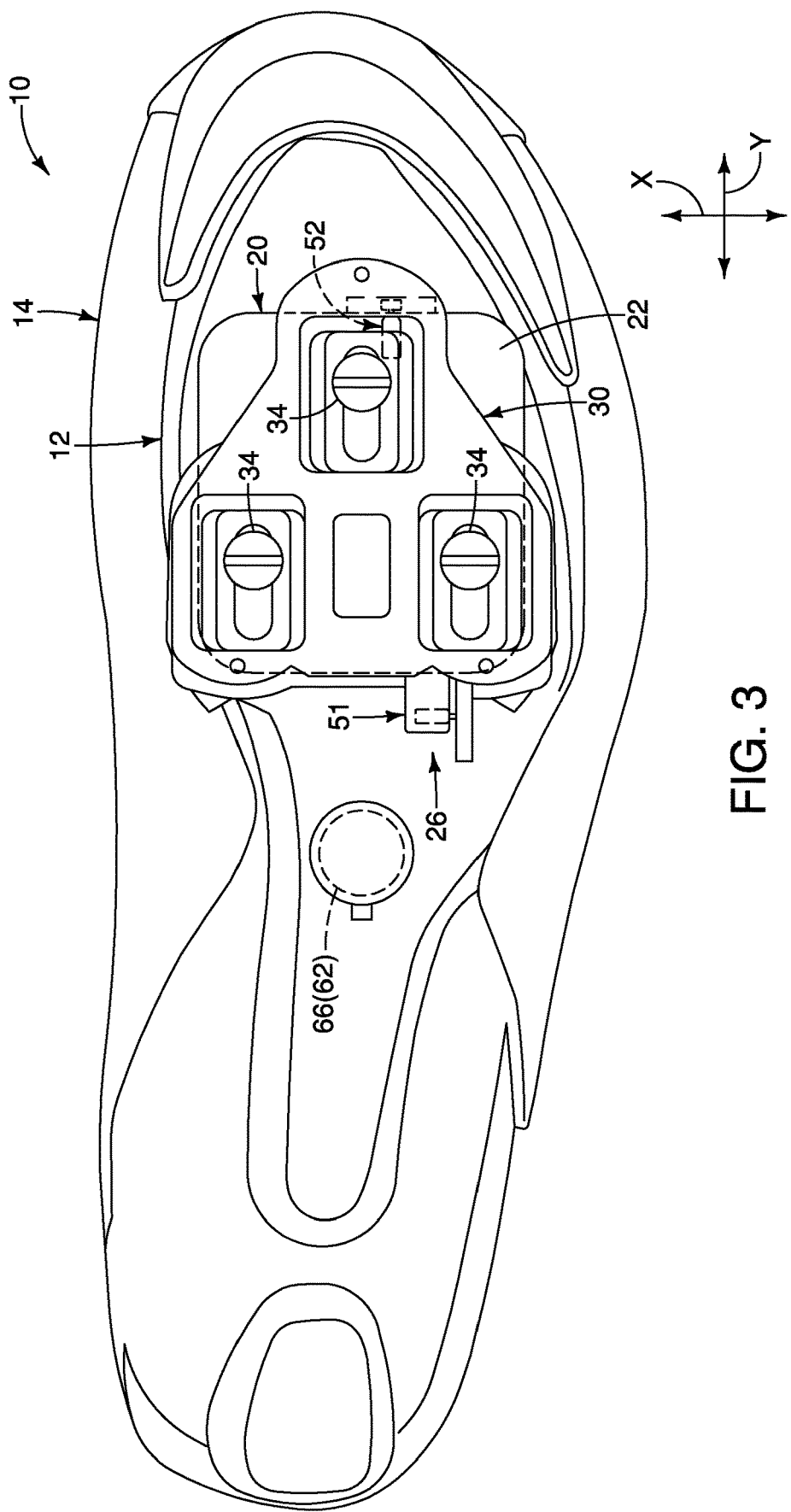
FIG. 3 is a bottom plan view of the cycling shoe illustrated in FIG. 2.
Figure 8:
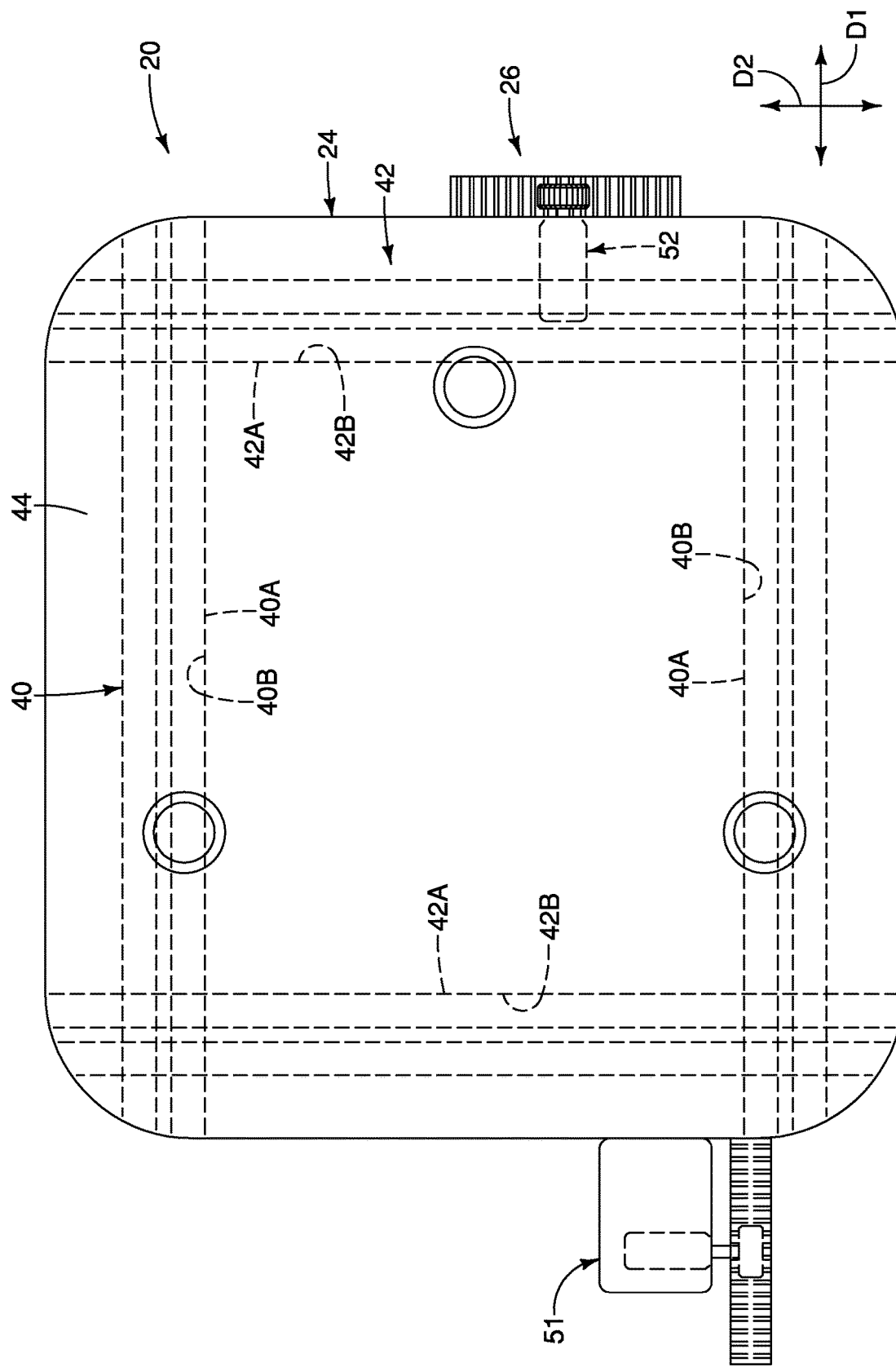
FIG. 8 is an enlarged bottom plan view of the cleat adapter assembly illustrated in FIG. 1.

Referring initially to FIG. 1, a cycling shoe system S is illustrated that used with a bicycle B in accordance with one embodiment. Here, the cycling shoe system S basically includes a cycling shoe 10 that is used in conjunction with at least one of a bicycle sensor that provides bicycle information regarding the bicycle B being ridden and at least one user information sensor that provides user information regarding a user wearing the cycling shoe 10. As explained below, the position of the cycling shoe 10 relative to a pedal PD is adjusted based on at least one of the bicycle information and the user information.

Here, the bicycle B is provided with a plurality of bicycle sensors BS for providing the bicycle information of the bicycle B that is being ridden by a rider wearing the cycling shoe 10. Here, the cycling shoe 10 is provided with one or more shoe sensors SS for providing the user information of a rider wearing the cycling shoe 10. Also, here, the cycling shoe system S further includes a user physical fitness monitor FM for providing the user information of a rider wearing the cycling shoe 10. Here, the bicycle B and the user physical fitness monitor FM wirelessly send data to the cycling shoe 10. For example, the bicycle B includes a controller ECU and a wireless communicator WC. The controller ECU receives the bicycle information from the bicycle sensors BS which is then provided to the wireless communicator WC for transmitting the bicycle information to the cycling shoe 10. Similarly, the user physical fitness monitor FM includes a controller and a wireless communicator for transmitting the user information to the cycling shoe 10. On the other hand, the shoe sensors SS are provided in the cycling shoe 10, and thus, can communicate the user information by wired communication.

Preferably, the bicycle information includes a bicycle condition. In particular, the bicycle condition includes at least one of a forward speed, a pedaling cadence, a pedaling input power, a driving force of a drive unit and global positioning coordinates of a bicycle. The bicycle condition is detected by the bicycle sensors BS. Thus, for example, the bicycle sensors BS include a forward speed sensor BS1, a pedaling cadence sensor B2, a pedaling input sensor BS3 and a GPS sensor BS4. The forward speed sensor BS1 is configured to detect information corresponding to a forward speed of the bicycle B. The cadence sensor BS2 is configured to detect information corresponding to a rotational speed of a crank axle of the bicycle B. The pedaling input sensor BS3 is configured to detect information corresponding to a torque applied to a crank of the bicycle B by a human driving force. The GPS sensor BS4 is configured to detect information corresponding to global positioning coordinates of the bicycle B.

On the other hand, the user information includes a shoe condition. The shoe condition is detected by the shoe sensors SS. In particular, the shoe condition includes a temperature of an inner sole, humidity of the inner sole and an inner sole pressure received from a user. In addition, the user information includes a user condition. The user condition is detected by the user physical fitness monitor FM. In particular, the user condition includes at least one of heart rate, body temperature, blood oxygen concentration and blood lactate level.

Here, the cycling shoe 10 is a left cycling shoe. Preferably, the cycling shoe system S includes a right cycling shoe that is a mirror image of the cycling shoe 10. Thus, the following description of the cycling shoe 10 applies to a right cycling shoe. However, the cycling shoe 10 can be configured as a dominate shoe and the right cycling shoe can be configured as a subordinate shoe. In this way, when the cycling shoe 10 is adjusted either automatically or by a user, the right cycling shoe receives a control signal such that the cycling shoe 10 and the right cycling shoe are adjusted in the same manner.

It should be understood from the drawings and the description herein that the terms "inner side" and "inboard side" refer to the right side of a shoe for the left foot, and the left side of a shoe for the right foot. In other words, the inner side or the inboard side is the side of the shoe facing the shoe on the other foot of the wearer. Similarly, the terms "outer side" and "outboard side" refer to the left side of the shoe for the left foot and the right side of the shoe for the right foot. The outer side or the outboard side is the side of the shoe facing away from the shoe on the other foot. As well, the terms "inner side" and "inboard side" are used interchangeably with respect to the present disclosure. Similarly, the terms "outer side" and "outboard side" are also used interchangeably with respect to the description of the present disclosure.

Referring now to FIGS. 1 to 4, the cycling shoe 10 basically comprises a sole 12 and an upper 14. The sole 12 defines a longitudinal direction Y and a lateral direction X that is perpendicular to the longitudinal direction X. The sole 12 supports the upper 14. Specifically, the sole 12 is attached to the upper 14. The sole 12 can be fixedly attached to the upper 14 in a conventional manner, such as with stitching, adhesives, and/or embedding portions the upper 14 within the sole 12. Thus, the upper 14 and the sole 12 are integrated together. Here, the upper 14 is a low-cut style of upper. However, the upper 14 is not limited to the low-cut style, but may be of any style. The upper 14 is made of any suitable natural or polymetric materials. The upper 14 can be formed of an expandable material or a non-expandable material. For example, the upper 14 can be made of a leather material, a nylon mesh and/or any other material that is utilized for conventional uppers.

In the first embodiment, as seen in FIGS. 2 to 9, a cleat adapter system 20 is provided for a cycling shoe. The cleat adapter system 20 basically comprises a first connecting portion 22 and a second connecting portion 24 and an adjuster 26. The adjuster 26 is configured to adjust a relative position between the first connecting portion 22 and the second connecting portion 24. As explained below, the relative position between the first connecting portion 22 and the second connecting portion 24 is automatically adjusted by the adjuster 26 based bicycle information regarding the bicycle B being ridden and user information regarding a user wearing the cycling shoe 10.

The first connecting portion 22 is configured to be connected to a cleat 30. The first connecting portion 22 having a cleat contact surface 22A that contacts the cleat 30 in a state in which the first connecting portion 22 is connected to the cleat 30. For example, here, the first connecting portion 22 includes a nut part 32 that configured to be fix the cleat 30 to the first connecting portion 22. More specifically, the nut part 32 includes a plurality of threaded holes 32a for threadedly receiving fixing screws 34. Thus, the cleat 30 is releasably coupled to the first connecting portion 22 in a reinstallable manner. Here, the cleat 30 is one of the standard types of cleats. However, any type of cleat can be used. Alternatively, the cleat 30 can be integrated into the first connecting portion 22 as a non-removable part of the first connecting portion 22.

The second connecting portion 24 is provided to the sole 12 of the cycling shoe 10. The second connecting portion 24 is connected to the first connecting portion 22. In particular, as explained below, the second connecting portion 24 is adjustably connected to the first connecting portion 22. In the first embodiment, the second connecting portion 24 is a provided to the sole 12 of the cycling shoe 10. Here, the second connecting portion 24 is releasably coupled to the sole 12 by a plurality of fasteners 36 (e.g., fixing screws). Alternatively, the second connecting portion 24 can be integrated into the sole 12 as a non-removable part of the sole 12.

In the first embodiment, the adjuster 26 is configured to adjust the relative position in a first direction D1 and a second direction D2 that is different with the first direction D1. In FIGS. 6 and 7, the first direction D1 is indicated by the symbol "⊙" which indicates a direction perpendicular to the drawing sheet. In FIGS. 4 and 5, the second direction D2 is indicated by the symbol "⊗" which indicates a direction perpendicular to the drawing sheet. The first direction D1 is the longitudinal direction Y of the sole 12 of the cycling shoe 10. The second direction D2 is the lateral direction X of the sole 12 of the cycling shoe 10. Here, the adjuster 26 includes a first linear displacement device 40 and a second linear displacement device 42. The first linear displacement device 40 is configured to provide linear adjustment of the first connecting portion 22 in the first direction D1 (the longitudinal direction Y) of the sole 12 with respect to the second connecting portion 24. The second linear displacement device 42 is configured to provide linear adjustment of the first connecting portion 22 in the second direction D2 (the lateral direction X) of the sole 12 with respect the second connecting portion 24.

In the first embodiment, the second connecting portion 24 includes a first part 44 and a second part 46. The first part 44 is fixed to the sole 12 by the fasteners 36. The second part 46 is adjustably coupled to the first part 44 by the first linear displacement device 40. The second part 46 is also adjustably coupled to the first connecting portion 22 by the second linear displacement device 42.

Here, for example, the first linear displacement device 40 includes a pair of first rails 40A and a pair of first tracks 40B. The first rails 40A are provided to one of the first part 44 and the second part 46, while the first tracks 40B are provided to the other one of the first part 44 and the second part 46. Here, the first rails 40A are provided to the second part 46, while the first tracks 40B are provided to the first part 44.

Also, for example, the second linear displacement device 42 includes a pair of second rails 42A and a pair of second tracks 42B. The second rails 40A are provided to one of the second part 46 and the first connecting portion 22, while the second tracks 40B are provided to the other one of the second part 46 and the first connecting portion 22. Here, the second rails 40A are provided to the first connecting portion 22, while the second tracks 40B are provided to the second part 46.

The cleat adapter system 20 basically further comprises an actuator 50. The actuator 50 operatively is coupled to one of the first connecting portion 22 and the second connecting portion 24. The actuator 50 is configured to adjust a relative position between the first connecting portion 22 and the second connection portion 24. Thus, in the illustrated embodiment, the actuator 50 is configured to actuate the adjuster 26. Here, in the first embodiment, the cleat 30 is movably with respect to the sole 12 in the first direction D1 (the longitudinal direction Y) and the second direction D2 (the lateral direction X) by the adjuster 26. To accomplish this two directions of movement, the actuator 50 includes a first actuator 50A and a second actuator 50B. The first actuator 50A is operatively coupled to the first linear displacement device 40. The second actuator 50B is operatively coupled to the second linear displacement device 42. In the first embodiment, the actuator 50 includes a motor that is configured to adjust the relative position in discrete steps. In particular, the first actuator 50A includes a first motor 51 that is configured to adjust the relative position in discrete steps. The second actuator 50B includes a second motor 52 that is configured to adjust the relative position in discrete steps. Preferably, the first motor 51 and the second motor 52 are reversible electric stepper motors.

The cleat adapter system 20 further comprises a controller 54. The controller 54 is configured to control the first motor 51 and the second motor 52 to move the cleat 30 with respect to the sole 12 in responses to either a user input or based on at least one of bicycle information and user information. Also, the controller 54 is configured to control corresponding actuators of the right cycling shoe. However, as mentioned above, the cycling shoe 10 can be independent from the right cycling shoe. Thus, the right cycling shoe can be provided with its own controller.

Basically, the controller 54 is configured to determine a target position based on at least one of the bicycle information and the user information. Preferably, the controller 54 is configured to determine a target position based on the bicycle information. More preferably, the controller 54 is configured to determine the target position based on the user information corresponding to the bicycle information. In the illustrated embodiment, the controller 54 is configured to control the actuator 50 to adjust the position of the one of the first connecting portion 22 and the second connecting portion 24 to the target position. In this way, the position of the cleat 30 with respect to the sole 12 is adjusted automatically to the target position based on at least one of the bicycle information and the user information. In the first embodiment, the target position includes a longitudinal target position and a lateral target position.

Figure 9:
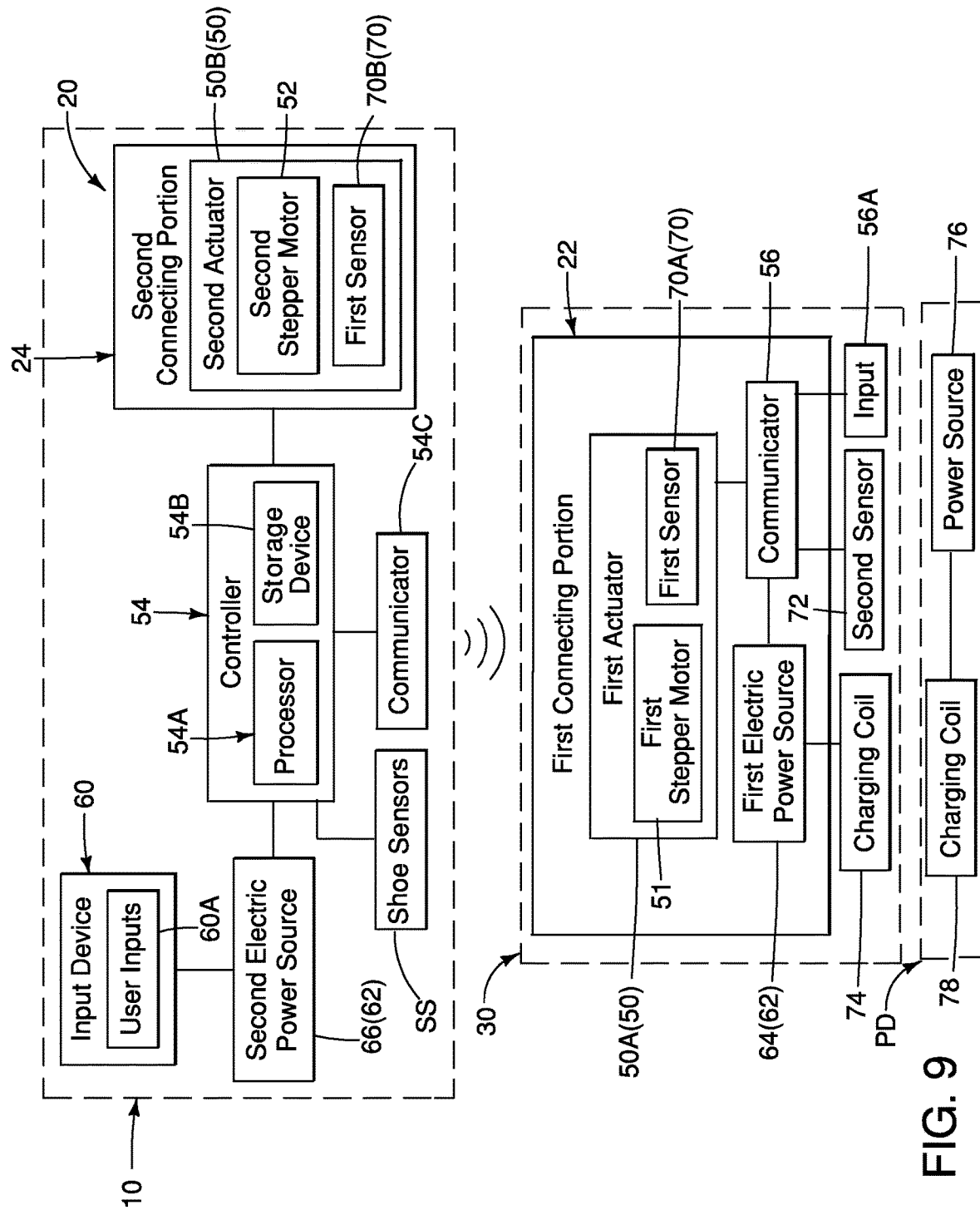
FIG. 9 is an overall diagrammatic view of the cleat adapter system including the cycling shoe and the cleat adapter assembly illustrated in FIG. 1.

As seen in FIG. 9, the controller 54 includes least one processor 54A that executes a predetermined control program for selectively operating the first motor 51 and the second motor 52 to position the cleat 30 relative to the sole 12. The at least one processor 54A can be, for example, a central processing unit (CPU) or a micro processing unit (MPU). The controller 54 can include processors provided at positions separate from each other. The controller 54 can include one or more microcomputers. The controller 54 is formed of one or more semiconductor chips that are mounted on a circuit board. Thus, the controller 54 is an electronic controller. The term "electronic controller" as used herein refers to hardware that executes a software program, and does not include a human.

The cleat adapter system 20 further comprises a storage device 54B having stored one or more target position settings corresponding to the user information. The storage device 54B stores various control programs and information used for various control processes. The storage device 54B also, preferably has an initial position for the cleat 30 relative to the sole 12 of the cycling shoe 10. The initial position for the cleat 30 is preferably set based on an initial position of the first connecting portion 22 relative to the sole 12 of the cycling shoe 10, and an initial position of the second connecting portion 24 relative to the sole 12 of the cycling shoe 10. Alternatively, the initial position for the cleat 30 can be set based on either the initial position of the first connecting portion 22 or the initial position of the second connecting portion 24. The initial position can be either a factory default position or a user set default position.

The target position can be adjusted based on prestored tables or prestored maps, which are preferably user adjustable. Alternatively, the target position can be adjusted based on a formula such as the lateral target position is adjusted two millimeters for each increase or decrease of twenty watts (W) of pedaling input power once the forward speed is over 20 kmph and the pedaling input power is greater than 200 W. Also, the target position can be adjusted in one direction based on one or move of the bicycle information and/or one or more of the user information. For example, the target position is adjusted so that the cleat 30 moves forward a predetermined amount relative to the sole 12 as pedaling force increases, and so that the cleat 30 moves backward a predetermined amount relative to the sole 12 as pedaling force decreases. In another example, the target position is adjusted so that the cleat 30 moves forward a predetermined amount relative to the sole 12 as cadence increases, and so that the cleat 30 moves backward a predetermined amount relative to the sole 12 as cadence decreases.

In another example, the target position is adjusted so that the cleat 30 is moved to a predetermined position based on the type of traveling surface as determined by the GPS coordinates. In particular, the target position can be different for paved roads, unpaved roads and off road.

Generally, the target positions are preferably set such that (1) there is no adjustment from the initial position at low speeds, for example, 2 kmph or less, (2) the cleat 30 is moved backward when traveling on level ground at a constant speed or a small acceleration, (3) the cleat 30 is moved forward when traveling uphill and with a high pedaling power, and (4) the cleat 30 is moved forward when traveling with a high acceleration.

The following tables show two examples of preset target positions based on a plurality of bicycle conditions.

TABLE 1

Preset - 1

| | Bicycle Information and User Information | | | | | | Adjustment | |
|---|---|---|---|---|---|---|---|---|
| Cleat Position | Forward Speed | Cadence | Pedal Input Power | GPS (road) | Drive Force (W) | Acceleration | X (mm) | Y (mm) |
| Initial (Default) | Any | Any | Any | Any | Any | Any | 0 | 0 |
| Forward | Over 20 km/h | Any | Over 200 W | Upslope paved | Any | Any | 0 | +10 |
| Mid 1 | Over 30 km/h | Over 80 rpm | Over 200 W | Level paved | Any | Any | 0 | +5 |
| Mid 2 | Over 30 km/h | Any | Any | Level paved | Any | Any | 0 | 0 |
| Rear | Over 20 km/h | Any | Under 150 W | Level paved | 50 to 200 W | Less than 2 kph/sec | 0 | −10 |
| Off road | Any | Any | Any | Any | Any | Any | 0 | −5 |

TABLE 1

Preset - 2

| | \multicolumn{5}{c|}{Bicycle Information and User Information} | | \multicolumn{2}{c}{Adjustment} |
|---|---|---|---|---|---|---|---|---|
| Cleat Position | Forward Speed | Cadence | Pedal Input Power | GPS (road) | Drive Force (W) | Acceleration | X (mm) | Y (mm) |
| Initial (Default) | Any | Any | Any | Any | Any | Any | 0 | 0 |
| Mid | 0 to 20 km/h | 0 to 100 rpm | Any | Any | Any | Any | 0 | 0 |
| Rear | Over 20 km/h | 0 to 80 rpm | Any | Any | Any | Less than 2 kph/sec | 0 | −10 |
| Forward | Over 20 km/h | 80 to 130 rpm | Any | Any | Any | Greater than 5 kph/sec | 0 | +10 |

The storage device 54B is any computer storage device or any non-transitory computer-readable medium with the sole exception of a transitory, propagating signal. For example, the storage device 54B includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

Here, the cleat adapter system 20 further comprises a communicator 56. In the illustrated embodiment, the communicator 56 is configured receive data from an external device. Here, the external device includes the wireless communicator WC of the bicycle B and the user physical fitness monitor FM. Of course, other types of external devices can be used with the cleat adapter system 20 such as a mobile phone, or a computer tablet, etc. Thus, the communicator 56 is configured to receive the user information from an external device. Here, the communicator 56 receives at least some of the user information from the user physical fitness monitor FM, which is one example of an external device.

The communicator 56 is configured to receive at least one of bicycle information and user information. In other words, the data received by the communicator 56 includes receive at least one of the bicycle information and the user information. Preferably The communicator 56 is electrically connected to the controller 54 to provide the bicycle information and/or the user information to the controller 54. In this way, the controller 54 operatively couples the actuator 50 and the communicator 56. Thus, the controller 54 is configured to control the actuator 50 to adjust a relative position between the first connecting portion 22 and the second connection portion based on the data. More preferably, the controller 54 is configured to control the actuator 50 to adjust the relative position based on at least one of the bicycle information and the user information.

In the first embodiment, the communicator 56 is a wireless communicator. Thus, the communicator 56 is configured to receive the bicycle information from the external device via wireless communication. The term "wireless communicator" as used herein includes a receiver, a transmitter, a transceiver, a transmitter-receiver, and contemplates any device or devices, separate or combined, capable of transmitting and/or receiving wireless communication signals. The wireless communication signals can be radio frequency (RF) signals, ultra-wide band communication signals, radio frequency identification (RFID), ANT+ communications, or Bluetooth® communications or any other type of signal suitable for short range wireless communications as understood in the bicycle field.

Also, in the first embodiment, the communicator 56 includes an input 56A to receive the bicycle information from an external device. More specially, the input 56A is provide in the cleat 30 such that the input 56A becomes electrically coupled to an electrical contact provided to a pedal PD. In this case, for example, the pedal PD is wired to the bicycle sensors BS by signal wires. Thus, the input 56A is electrically connected to the bicycle sensors BS by the signal wires. Thus, the cleat adapter system 20 can be used with a bicycle that is equipped with a wireless communicator, and can be used with a bicycle that is equipped pedals that are connected to the bicycle sensors BS by signal wires.

The controller 54 can be configured to communicate with the first actuator 50A and the second actuator 50B by wired communication and/or a wireless communication. Here, the controller 54 is configured to communicate with the first actuator 50A by wireless communication. The first actuator 50A includes a first wireless communicator 56, and the controller 54 includes a second wireless communicator 54C that is configured to wirelessly communicate with the first wireless communicator 56. On the other hand, the controller 54 is configured to communicate with the second actuator 50B by wired communication. The controller 54 is connected to the second actuator 50A by a wire 58 to communicate. The controller 54 can communicate with the second actuator 50A via power line communication (PLC) and/or a dedicated signal wire.

The cleat adapter assembly 20 further comprises an input device 60 that is configured to operate the adjuster 26. Here, the input device 60 is provided on the upper 14 of the cycling shoe 10. Alternatively, a remote input device can be used to wirelessly communicate user commands to the second wireless communicator 54C of the controller 54. The input device 60 includes a plurality of user inputs 60A. Here, the user inputs 60A are buttons. However, the user inputs 60A can include, for example, a toggle switch, a lever, a dial and/or a touch screen. Here, the input device 60 communicates with the controller 54 using power line communication (PLC).

As seen in FIG. 9, the cleat adapter assembly 20 further comprises an electric power source 62 that is configured to provide an electric power to both of the actuator 50 (the first actuator 50A and the second actuator 50B) and the controller 54. For example, the electric power source 62 has a first power source 64 that is configured to provide the electric power to the actuator 50A. The electric power source 62 has a second electric power source 66 that is configured to provide an electric power to the controller 54. The electric power source 62 includes at least one of a coin battery, a rechargeable battery, a capacitor, and a power generator. Here, the first power source 64 preferably includes a power generator and at least one of a rechargeable battery and capacitor. On the other hand, the second electric power source 66 includes a coin battery.

As diagrammatically shown in FIG. 9, the cleat adapter system 20 further comprises a first sensor 70 that is configured to sense a relative position of the first connecting portion 22 and the second connecting portion 24. In the first embodiment, the first sensor 70 includes a first sensor 70A and a first sensor 70B. The first actuator 50A is provided with the first sensor 70A. The second actuator 50B is provided with the first sensor 70B. The first sensor 70A and the first sensor 70B are configured to output position signals to the controller 54. In this way, the controller 54 is configured to determine a current position of the cleat 30 relative to the sole 12.

The first sensor 70A can be, for example, a rotary encoder that senses a rotational position of an output shaft of the first motor 51 or a rotary part of a gear reducer provided to the first motor 51. Similarly, the first sensor 70B can be, for example, a rotary encoder that senses a rotational position of an output shaft of the second motor 52 or a rotary part of a gear reducer provided to the second motor 52. By sensing the operation of the first motor 51 and the second motor 52, the relative position of the first connecting portion 22 and the second connecting portion 24 can be determined by the controller 54. Thus, the controller 54 is configured to determine a relative movement amount of the first connecting portion 22 and the connecting second portion 24 based on the relative position detected by the first sensor 70. Then, the controller 54 is configured to automatically control the actuator 50 to adjust one of the first connecting portion 22 and the second connecting portion 24 to the target position.

As diagrammatically shown in FIG. 9, the cleat adapter system 20 further comprises a second sensor 72 that is configured to detect an engagement between the cleat 30 and a pedal PD. The second sensor 72 can be provided in the cleat 30 to detect an engagement between the cleat 30 and the pedal PD. The second sensor 72 can be, for example, a contact sensor that detects contact between the cleat 30 and a pedal PD. Alternatively, the second sensor 72 can be, for example, a proximity sensor that detect the presence of the pedal PD adjacent to the cleat 30 for a predetermined time. Upon the cleat 30 engaging the pedal PD, the second sensor 72 outputs a cleat engagement signal to the communicator 56, which in outputs a wireless signal to the communicator 54C for indicating the cleat engagement with the pedal PD. The communicator 54C then communicates the engagement between the cleat 30 and the pedal PD to the controller 54. The controller 54 is configured to start the control of the actuator 50 to adjust relative position the first connecting portion 22 and the second connecting portion 24 upon determining engagement between the cleat 30 and the pedal PD.

When the second sensor 72 detects disengagement of the cleat 30 from the pedal PD, the second sensor 72 outputs a cleat disengagement signal to the communicator 56, which in outputs a wireless signal to the communicator 54C for indicating the cleat being disengaged from the pedal PD. The communicator 54C then communicates the disengagement of the cleat 30 from the pedal PD to the controller 54. Preferably, the controller 54 is configured to reset the cleat 30 to a preferred default position by adjusting the positions of at least one of the first connecting portion 22 and the second connecting portion 24 to its initial position that is stored in the storage device 54B. Using prestored setting in the storage device 54B, the controller 54 is configured to determine an initial position. Thus, the controller 54 is configured to control of the actuator 50 to adjust the position to the initial position upon determining disengagement of the cleat 30 from the pedal PD. More specifically, the controller 54 is configured to control the actuator 50 to adjust the position of the one of the first connecting portion 22 and the second connecting portion 24 to the initial position.

As diagrammatically shown in FIG. 9, the cleat adapter system 20 further comprises a rechargeable electric power source that is configured to receive electric power from the pedal PD where the cleat 30 is engaged with the pedal PD. In particular, the first electric power source 64 is a rechargeable electric power source. The cleat adapter system 20 further comprises a charging coil 74 for receiving electric power from a power source 76 provided to the pedal PD via a charging coil 78 of the pedal PD. The charging coil 74 and the charging coil 78 are preferably non-contact charging coils. However, the charging coil 74 and the charging coil 78 can be contact charging coils if needed an/or desired.

Figure 10:
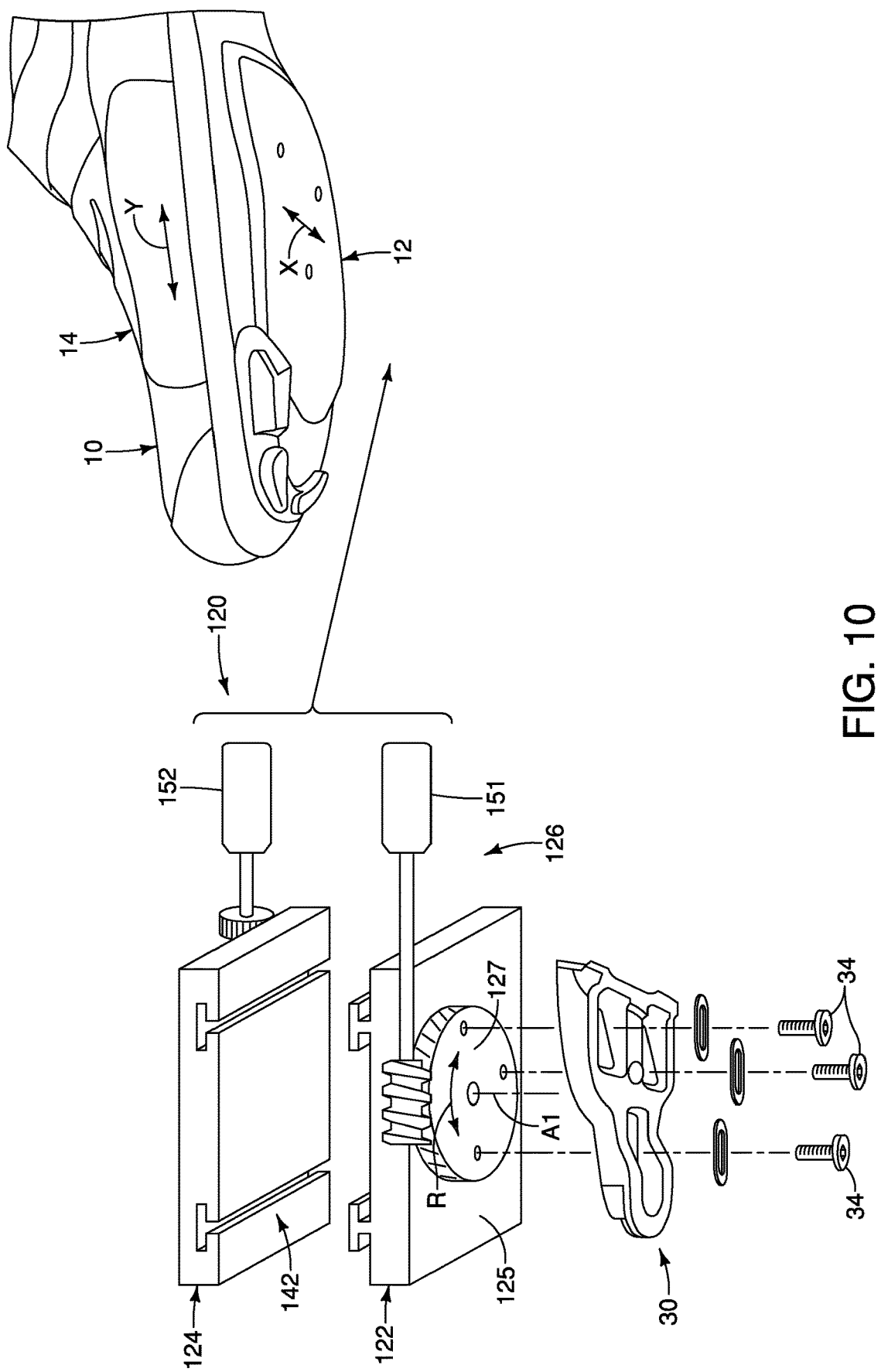
FIG. 10 is a diagrammatic perspective view of a cleat adapter assembly in accordance with another embodiment.

Referring now to FIG. 10, a cleat adapter assembly 120 is diagrammatically illustrated in accordance with another embodiment of the present disclosure. The cleat adapter assembly 120 can be used with the cycling shoe 10. The cleat adapter assembly 120 basically comprises a first connecting portion 122, a second connecting portion 124 and an adjuster 126. Here, the first connecting portion 122 is adjustably connected to the second connecting portion 124 by the adjuster 126 in one direction (either the longitudinal direction Y or the lateral direction X). Preferably, the second connecting portion 124 can be mounted to the sole 12 of the cycling shoe 10 in a first orientation in which the second connecting portion 124 is adjustably connected to the first connecting portion 122 by the adjuster 126 in the longitudinal direction Y. Also, the second connecting portion 124 can be alternatively mounted to the sole 12 of the cycling shoe 10 in a second orientation in which the first connecting portion 122 is adjustably connected to the second connecting portion 124 by the adjuster 126 in the lateral direction X. The adjuster 126 includes linear displacement device having a track and rail guide and a rack and pinion drive similar to the one discussed above.

Here, the first connecting portion 122 includes a base part 125 and a rotary mounting plate 127. The rotary mounting plate 127 is rotatably mounted to the base part 125 about an axis A1. In other words, the adjuster 126 is configured to adjust the relative position in a rotational direction R around the axis A1 that is perpendicular to the longitudinal direction Y and the lateral direction X.

In this embodiment, the actuator for the adjuster 126 includes a first motor 151 and a second motor 152. The first motor 151 and the second motor 152 are operatively connected to the adjuster 126 by flexible drive shafts. Thus, the locations of the first motor 151 and the second motor 152 can be conveniently located as needed and/or desired. The first motor 151 and the second motor 152 can be controlled using the controller 54 and the input device 60 as discussed above with respect to the first embodiment. Also, the first motor 151 and the second motor 152 can receive electric power from the electric power source 62 as discussed above with respect to the first embodiment.

Figure 11:
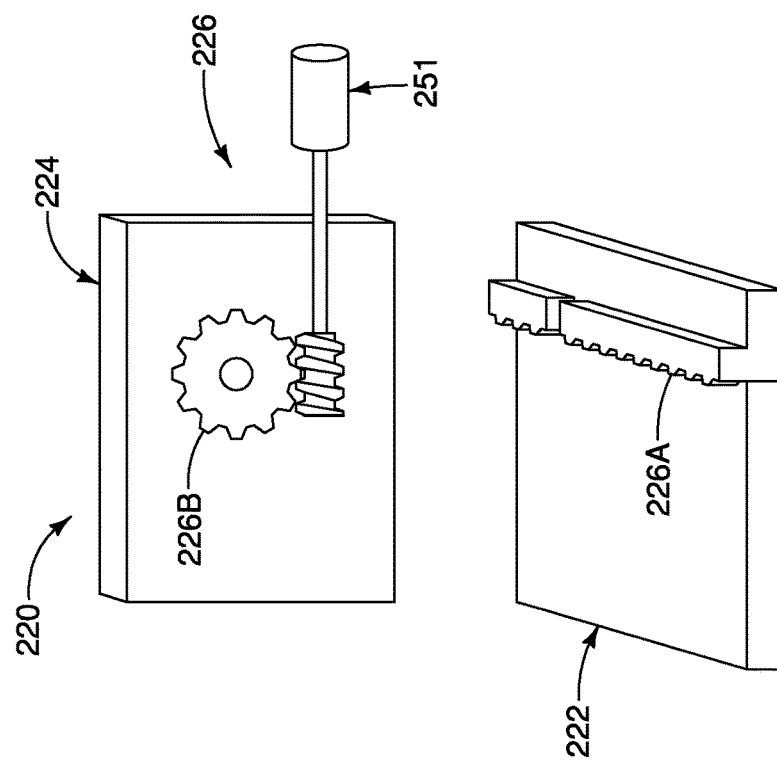
FIG. 11 is a diagrammatic perspective view of a cleat adapter assembly in accordance with another embodiment.

Referring now to FIG. 11, a cleat adapter assembly 220 is diagrammatically illustrated in accordance with another embodiment of the present disclosure. The cleat adapter assembly 220 can be used with the cycling shoe 10. The cleat adapter assembly 220 basically comprises a first connecting portion 222, a second connecting portion 224 and an adjuster 226. Here, the adjuster 226 has a single adjustment direction. Preferably, the second connecting portion 224 can be mounted to the sole 12 of the cycling shoe 10 in either a first orientation or a second orientation that is perpendicular to the orientation. In this way, the user can select either a longitudinal adjustment or a lateral adjustment.

In this embodiment, the adjuster 226 includes a rack gear 226A provided to the first connecting portion 222, and a pinion gear 226B provided to the second connecting portion 224. A motor 251 is provided to rotate the pinion gear 226B which is engaged with the rack gear 226A. Thus, rotation of the pinion gear 226B causes the rack gear 226A to move in a linear direction. In this way, the first connecting portion 222 is adjustably connected to the second connecting portion 224 via the adjuster 226.

Figure 12:
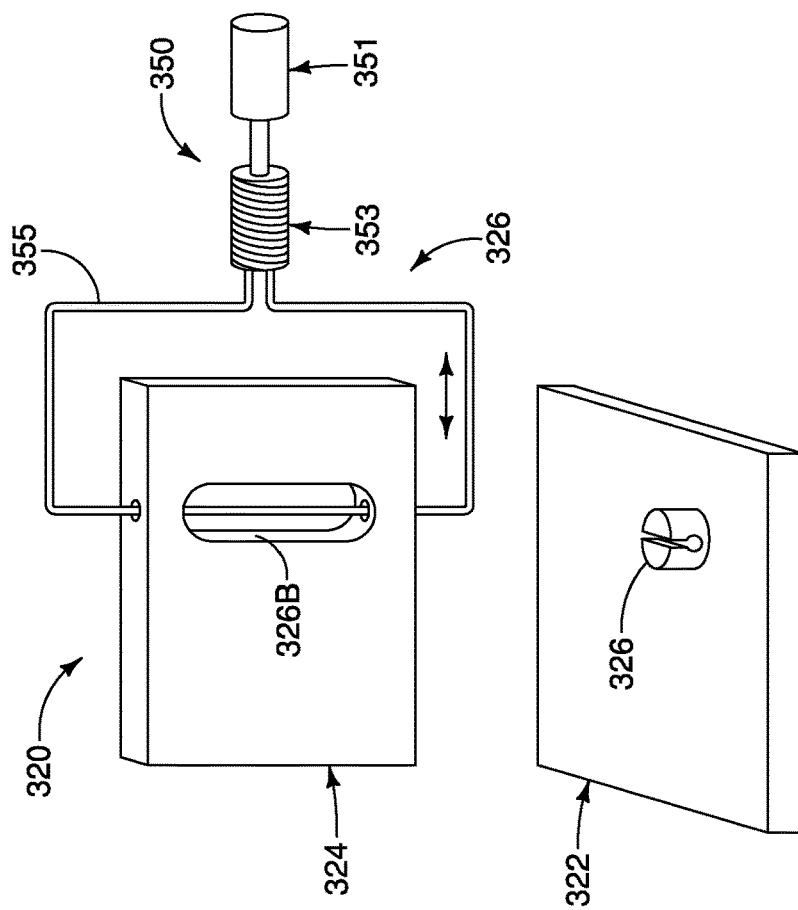
FIG. 12 is a diagrammatic perspective view of a cleat adapter assembly in accordance with another embodiment.

Referring now to FIG. 12, a cleat adapter assembly 320 is diagrammatically illustrated in accordance with another embodiment of the present disclosure. The cleat adapter assembly 320 can be used with the cycling shoe 10. The cleat adapter assembly 320 basically comprises a first connecting portion 322, a second connecting portion 324 and an adjuster 326. Here, the adjuster 326 has a single adjustment direction. Preferably, the second connecting portion 324 can be mounted to the sole 12 of the cycling shoe 10 in either a first orientation or a second orientation that is perpendicular to the orientation. In this way, the user can select either a longitudinal adjustment or a lateral adjustment.

In this embodiment, the adjuster 326 includes a guide pin 326A provided to the first connecting portion 322, and a slot 326B provided to the second connecting portion 324. Here, the cleat adapter assembly 320 includes a motor 351 that rotates a spool 353 for moving a cable 355. The guide pin 326A is fixedly coupled to the cable 355 for linear movement in the slot 326B in response to rotation of the spool 353 by the motor 351.

Figure 13:
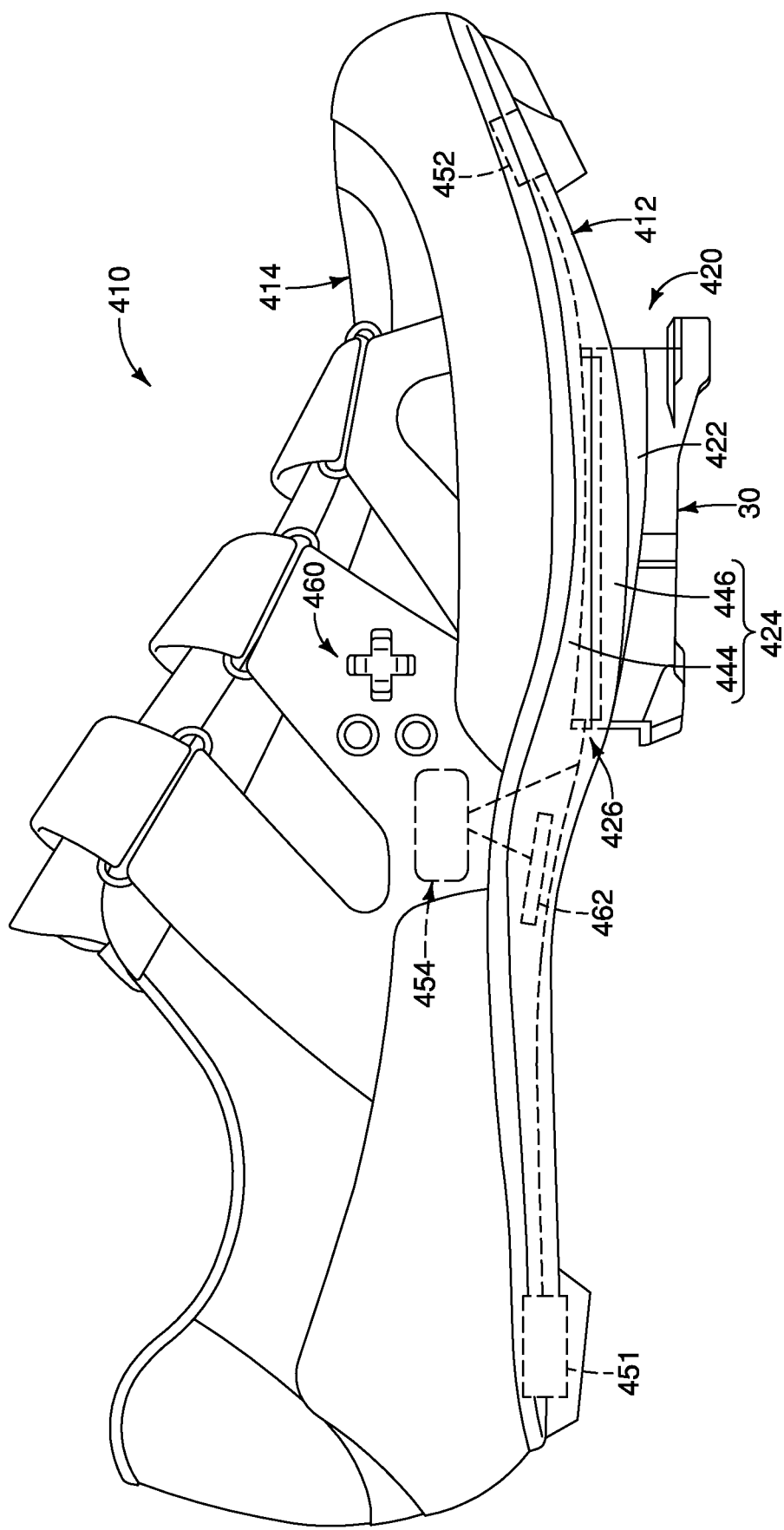
FIG. 13 is a side elevational view of a cycling shoe equipped with a cleat adapter assembly in accordance with another embodiment.

Referring now to FIG. 13, a cycling shoe 410 having a cleat adapter assembly 420 is illustrated in accordance with another embodiment of the present disclosure. The cycling shoe 410 includes a sole 412 and upper 414. Here, the cleat adapter assembly 420 partially integrated into the sole 412 The cleat adapter assembly 420 basically comprises a first connecting portion 422, a second connecting portion 424 and an adjuster 426. Here, the second connecting portion 424 is integrated with the sole 412. More specifically, the second connecting portion 424 includes a first part 444 that is part of the sole 412 and a second part 446 that is adjustably disposed between the first part 444 and the second connecting portion 424. The first connecting portion 422 is adjustably connected to the second connecting portion 424 by the adjuster 426. The adjuster 426 can be identical to the adjuster 26. Alternatively, the adjuster 426 and the first connecting portion 422 and/or the second connecting portion 424 can be modified in accordance with any of the other embodiments. In any case, in this embodiment, the second connecting portion 424 is at least partially formed by the sole 412.

In this embodiment, the actuator for the adjuster 426 includes a first motor 451 and a second motor 452 that are embedded into the sole 412. The first motor 451 and the second motor 452 are connected to the adjuster 426 by flexible drive shafts. Thus, the locations of the first motor 451 and the second motor 452 can be conveniently located as needed and/or desired.

Also, in this embodiment, the cleat adapter assembly 420 further comprises a controller 454 that is configured to control the first motor 451 and the second motor 452. cleat adapter assembly 420 further comprises an input device 460 that is configured to operate the adjuster 426. The cleat adapter assembly 420 further comprises an electric power source 462 that is configured to provide an electric power to the first motor 451, the second motor 452 and the controller 454.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position or the cycling shoe in resting in a horizontal position.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A cleat adapter system for a cycling shoe, the cleat adapter system comprising:
   a first connecting portion configured to be connected to a cleat, the first connecting portion having a cleat contact surface that contacts the cleat in a state in which the first connecting portion is connected to the cleat;
   a second connecting portion connected to the first connecting portion and integrated with a sole of the cycling shoe, the first connecting portion being disposed between the cleat and the second connecting portion in a state in which the first connecting portion is connected to the cleat;
   an actuator operatively coupled to one of the first connecting portion and the second connecting portion, and configured to adjust a relative position between the first connecting portion and the second connection portion;
   a communicator configured to receive at least one of bicycle information and user information; and
   a controller operatively coupling the actuator and the communicator, and configured to control the actuator to adjust the relative position based on at least one of the bicycle information and the user information.

2. The cleat adapter system according to claim 1, wherein the controller is configured to determine a target position based on at least one of the bicycle information and the user information, and configured to control the actuator to adjust the position of the one of the first connecting portion and the second connecting portion to the target position.

3. The cleat adapter system according to claim 2, further comprising
   a second sensor configured to detect an engagement between the cleat and a pedal, and
   the controller being configured to start the control of the actuator to adjust relative position the first connecting portion and the second connecting portion upon determining engagement between the cleat and the pedal.

4. The cleat adapter system according to claim 1, wherein the controller is configured to determine an initial position, and configured to control the actuator to adjust the position of the one of the first connecting portion and the second connecting portion to the initial position.

5. The cleat adapter system according to claim 1, wherein the communicator is a wireless communicator.

6. The cleat adapter system according to claim 1, wherein the communicator includes an input to receive the bicycle information from an external device.

7. The cleat adapter system according to claim 6, wherein the communicator is configured to receive the bicycle information from the external device via wireless communication.

8. The cleat adapter system according to claim 1, wherein the bicycle information includes a bicycle condition.

9. The cleat adapter system according to claim 8, wherein the bicycle condition includes at least one of a forward speed, a pedaling cadence, a pedaling input power, a driving force of a drive unit and global positioning coordinates of a bicycle.

10. The cleat adapter system according to claim 1, wherein
   the user information includes a shoe condition.

11. The cleat adapter system according to claim 10, wherein
   the shoe condition includes a temperature of an inner sole, humidity of the inner sole and an inner sole pressure received from a user.

12. The cleat adapter system according to claim 1, wherein
   the user information includes a user condition.

13. The cleat adapter system according to claim 12, wherein
   the user condition includes at least one of heart rate, body temperature, blood oxygen concentration and blood lactate level.

14. The cleat adapter system according to claim 1, further comprising
   a first sensor configured to sense a relative position of the first connecting portion and the second connecting portion.

15. The cleat adapter system according to claim 14, wherein
   the controller is configured to determine a target position based on the bicycle information, the controller is further configured to determine a relative movement amount of the first connecting portion and the connecting second portion based on the relative position detected by the first sensor, and the controller is further configured to automatically control the actuator to adjust one of the first connecting portion and the second connecting portion to the target position.

16. The cleat adapter system according to claim 15, wherein
   the controller is configured to determine the target position based on the user information corresponding to the bicycle information.

17. The cleat adapter system according to claim 16, further comprising
   a storage device having stored one or more target position settings corresponding to the user information.

18. The cleat adapter system according to claim 17, wherein
   the communicator is further configured to receive the user information from an external device.

19. A cleat adapter system for a cycling shoe, the cleat adapter system comprising:
   a first connecting portion configured to be connected to a cleat;
   a second connecting portion connected to the first connecting portion;
   an actuator operatively coupled to one of the first connecting portion and the second connecting portion, and configured to adjust a relative position between the first connecting portion and the second connection portion;
   a communicator configured to receive at least one of bicycle information and user information;
   a controller operatively coupling the actuator and the communicator, and configured to control the actuator to adjust the relative position based on at least one of the bicycle information and the user information;

a first sensor configured to sense a relative position of the first connecting portion and the second connecting portion, the controller is configured to determine a target position based on the bicycle information, the controller is further configured to determine a relative movement amount of the first connecting portion and the connecting second portion based on the relative position detected by the first sensor, and the controller being further configured to automatically control the actuator to adjust one of the first connecting portion and the second connecting portion to the target position, the controller being further configured to determine the target position based on the user information corresponding to the bicycle information; and a storage device having stored one or more target position settings corresponding to the user information, the communicator being further configured to receive the user information from an external device, the controller further being configured to control of the actuator to adjust the position to the initial position upon determining disengagement of the cleat from the pedal.

20. A cleat adapter system for a cycling shoe, the cleat adapter system comprising:

a first connecting portion configured to be connected to a cleat;

a second connecting portion connected to the first connecting portion;

an actuator operatively coupled to one of the first connecting portion and the second connecting portion, and configured to adjust a relative position between the first connecting portion and the second connection portion;

a communicator configured to receive at least one of bicycle information and user information;

a controller operatively coupling the actuator and the communicator, and configured to control the actuator to adjust the relative position based on at least one of the bicycle information and the user information; and a rechargeable electric power source configured to receive electric power from a pedal where the cleat is engaged with a pedal.

21. A cleat adapter system for a cycling shoe, the cleat adapter system comprising:

a first connecting portion configured to be connected to a cleat, the first connecting portion having a cleat contact surface that contacts the cleat in a state in which the first connecting portion is connected to the cleat;

a second connecting portion connected to the first connecting portion and integrated with a sole of the cycling shoe, the first connecting portion being disposed between the cleat and the second connecting portion in a state in which the first connecting portion is connected to the cleat;

an actuator operatively coupled to one of the first connecting portion and the second connecting portion, and configured to adjust a position of the one of the first connecting portion and the second connecting portion relative to other one of the first connecting portion and the second connecting portion;

a communicator configured to receive data from an external device; and a controller operatively coupling the actuator and the communicator, and configured to control the actuator to adjust the relative position between the first connecting portion and the second connecting portion based on the data.

* * * * *